April 4, 1939.  A. O. SCHAEFER  2,153,433
DRIVE ADAPTER FOR MACHINES
Filed April 8, 1937
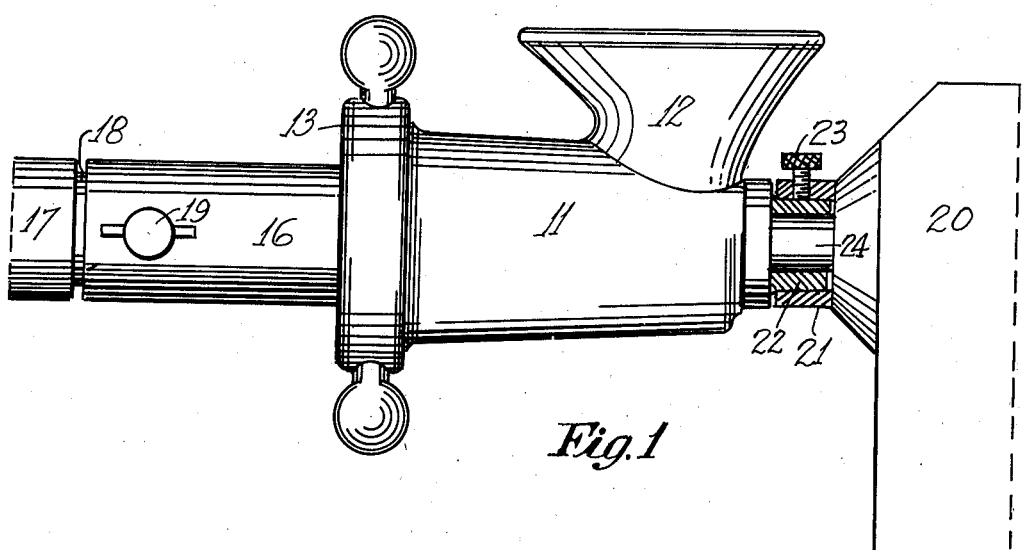
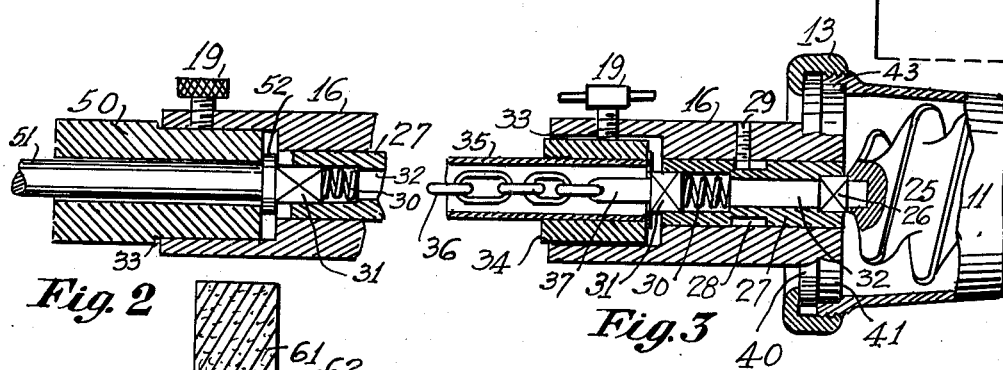
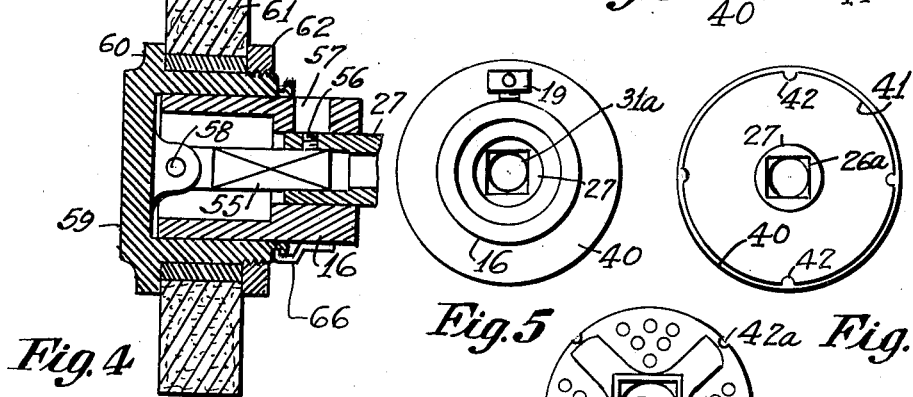
INVENTOR.
Adolph O. Schaefer,
BY
ATTORNEY.

Patented Apr. 4, 1939

2,153,433

UNITED STATES PATENT OFFICE 2,153,433

DRIVE ADAPTER FOR MACHINES

Adolph O. Schaefer, Brooklyn, N. Y., assignor to Atlantic Service Company Inc., Brooklyn, N. Y., a corporation of New York Application April 8, 1937, Serial No. 135,709

3 Claims. (Cl. 64—4)

This invention relates to a drive adapter for machines and it has for an object to adapt the drive of the machine for driving other machines. An application of the invention is illustrated in connection with meat choppers which are driven by an electric motor and by the use of this invention the drive that is imparted to the rotating member of the meat chopper may be applied to other devices. The invention will be more particularly understood in connection with the following specification and the accompanying drawing, in which Fig. 1 is an elevation of a motor, meat chopper and adapter assembled complete, with the attachment between the motor and the meat chopper shown in section;

Fig. 2 is a sectional detail of the adapter applied to drive a rotating shaft;

Fig. 3 is a sectional drawing of the adapter applied to a meat chopper and used to drive a flexible shaft;

Fig. 4 is a sectional drawing showing the adapter used to support and to drive a grinding wheel;

Fig. 5 is an end view of the adapter looking towards the right;

Fig. 6 is an end view of the adapter looking from the left, and

Fig. 7 is a front view of the cutter and the cutter plate of the meat grinder which is removed when the adapter is clamped to the grinder.

In a butcher's establishment there are usually a number of machines which are operated by power and frequently this power is supplied by an electric motor. Generally these mechanisms are not operating at the same time so that it is possible to use the same motor for driving different machines and the present invention includes an adapter whereby this arrangement may be conveniently carried out.

A popular machine that is motor operated is a meat chopper which usually comprises a worm screw driven by the motor and a perforated end plate having a rotating cutter which is driven with the screw. In practice it is necessary to replace at frequent intervals the end plate and the cutter and for this reason these parts are made to standard sizes and are interchangeable. In applying this invention advantage is taken of this fact and the adapter is provided with a flange at its inner end which corresponds in size with the end plate of the chopper and is secured to the chopper after the end plate is removed by the same clamping mechanism. The adapter comprises an arbor formed integral with the end plate and which forms a rigid continuation of the frame of the chopper when it is clamped in place.

The arbor is cored on the axial line of the worm and a spindle is provided in this core which rotatably engages the end of the worm. The outer end of the arbor is preferably, formed in a socket to receive the mechanism to be driven and the shaft of this mechanism is coupled to the outer end of the spindle, thereby providing a drive from the motor to the mechanism.

The spindle is provided with a limited longitudinal movement and is subject to a pressure of a spring which holds it in engagement with the worm shaft when a driven mechanism is coupled to the arbor.

In the drawing, 11 is the meat chopper provided with the hopper 12 and with the clamping ring 13 which normally clamps the perforated plate 14, Fig. 7 and the cutter 12 against the end of the worm 25, when the mechanism is used for chopping meat. This mechanism is driven by the motor 20, through the shaft 24 and which is coupled with the chopper 11 by the socket 21 and the stem 22 which are held in engagement by the screw 23. This is a common construction in machines of this type.

The adapter 16 has secured to its outer end the stem 17 of the machine to be operated, which, through the projection 18 and screw 19 may be rigidly clamped to the arbor 16.

The arbor 16 at its inner end has formed thereon a flange 40 and a second flange 41, corresponding to the diameter of the end plate 14. Flange 40 is clamped against the frame of the chopper 11 by the clamping nut 13 with the flange 41 occupying the position normally occupied by plate 14. The plate 14 is provided with a number of grooves 42a on its edge to receive dowel pins 43 which prevent this plate from rotating and the flange 41 is provided with corresponding grooves at 42 so that the arbor has a nonturning engagement with the frame 11 and the flange holds it in alignment with the axis of the worm 25.

In the core of the arbor 16 the spindle 27 is located which is provided with an annular groove at 28 engaged by the screw stud 29 in the arbor 16, which, while permitting the spindle to rotate, limits its longitudinal movement in the arbor. The inner end of the spindle is provided with a square aperture 26a, which receives the square end 26 of the bearing for the worm 25 and which is normally used to engage the square socket 27 of the cutter 15. This rotates the spindle with the worm. The outer end of the spindle is provided with a square socket 31a which receives the square end 31 of the member to be driven. Behind the member 31 the coil spring 30 is located which engages the shoulder of the spindle where the round bore 32 begins. This spring urges the spindle towards the worm 25, as permitted by slot 27 and maintains the inner end of the spindle coupled at 26 to the driving shaft.

The outer end of the arbor 16 is preferably formed in a socket at 33 to receive the shank 18 or the coupling end of 34 of the member to be driven. In Fig. 3 the member 34 is fixed in the end of a flexible shaft comprising the chain 36 and the eye 37 connected with the square member 31 to rotate the chain as the spindle rotates. The chain is protected by a flexible covering 35.

In Fig. 2 the arbor 16 is connected to the stem 50 of a tool grinder or other device which has a driven shaft 51 with a head 52 and with the square end at 31 to engage the square aperture in the spindle 27.

In Fig. 4 the arbor 16 is used for the mounting of the abrasive wheel 61 which is secured to the cap 59 by the flange 60 and the nut 61. This cap is mounted to rotate on the end of arbor 16 and is driven by the square connection 55, coupled with the spindle 27 and pivotally connected at 58 with the cap 59. An aperture is provided at 57 in the arbor 16 whereby the set screw 56 in the spindle 27 is made accessible for attaching the member 55 to the spindle and for securing the cap in place on the arbor. The cap is also secured by the latch 66. Wheel 61 may be replaced by a gear or other device.

This invention admits of a variety of uses in addition to those illustrated, it is easy to apply and does not readily get out of order.

Having thus described my invention, I claim:

1. An adapter for a driving mechanism comprising a frame with a moving shaft and an arbor with a flange at one end for clamping to said frame in axial alignment with said moving shaft and having a hollow core, a cap for the end of said arbor having a socket forming a bearing on the end of the arbor, means for mounting a tool on said cap, a spindle in said core, means for coupling said spindle with said moving shaft and means enclosed by said arbor for coupling said spindle with said cap.

2. An adapter for a driving mechanism comprising a frame with a moving shaft and an arbor with a flange at one end for clamping to said frame in axial alignment with said moving shaft and having a hollow core, a cap for the end of said arbor having a socket forming a bearing on the end of the arbor, means for mounting a tool on said cap, a spindle in said core, means for coupling said spindle with said moving shaft means for coupling said cap to said spindle, and means holding said cap in place on said arbor.

3. An adapter for a driving mechanism comprising a frame with a rotating shaft, an arbor with means for attaching to said frame having a hollow core with a spindle coupled to said rotating shaft, a hollow cap for the end of said arbor rotating on said arbor, a grinding tool mounted on said cap and coupling means connecting the inside centre of said cap with said spindle.

ADOLPH O. SCHAEFER.